US012607915B2

(12) United States Patent
Jiang et al.

(10) Patent No.: US 12,607,915 B2
(45) Date of Patent: Apr. 21, 2026

(54) ROTATING BASE AND IMAGE CAPTURING MODULE

(71) Applicant: Chicony Electronics Co., Ltd., New Taipei City (TW)

(72) Inventors: Yi-Sing Jiang, New Taipei City (TW); Pei-Sheng Tsai, New Taipei City (TW)

(73) Assignee: Chicony Electronics Co., Ltd., New Taipei City (TW)

( * ) Notice: Subject to any disclaimer, the term of this patent is extended or adjusted under 35 U.S.C. 154(b) by 143 days.

(21) Appl. No.: 18/399,716

(22) Filed: Dec. 29, 2023

(65) Prior Publication Data

US 2025/0068042 A1     Feb. 27, 2025

(30) Foreign Application Priority Data

Aug. 24, 2023    (TW) ................................. 112131964

(51) Int. Cl.
*G03B 17/56*        (2021.01)
*H04N 23/51*        (2023.01)
(52) U.S. Cl.
CPC ........... *G03B 17/561* (2013.01); *H04N 23/51* (2023.01)

(58) Field of Classification Search
CPC .............................. G03B 17/561; H04N 23/51
See application file for complete search history.

(56) References Cited

U.S. PATENT DOCUMENTS

| | | | | |
|---|---|---|---|---|
| 11,338,919 | B2 * | 5/2022 | Liu ........................ | F16M 13/02 |
| 2003/0030745 | A1 * | 2/2003 | Meek ...................... | H04N 23/51 |
| | | | | 348/370 |
| 2020/0166385 | A1 * | 5/2020 | Jiang ...................... | F16M 11/14 |

FOREIGN PATENT DOCUMENTS

TW           I675982        11/2019

\* cited by examiner

*Primary Examiner* — Minh Q Phan
(74) *Attorney, Agent, or Firm* — JCIPRNET

(57)                ABSTRACT

A rotating base includes a first housing, a second housing, a rotating assembly, an elastic tube and at least one annular elastic member. The rotating assembly is connected between the first housing and the second housing. The elastic tube passes through the rotating assembly and extends from the first housing to the second housing. The annular elastic member is sleeved on the elastic tube and is compressed between the elastic tube and one of the first housing and the second housing. An image capturing module having the rotating base is also provided.

22 Claims, 12 Drawing Sheets

ROTATING BASE AND IMAGE CAPTURING MODULE

CROSS-REFERENCE TO RELATED APPLICATION

This application claims the priority benefit of Taiwan application serial no. 112131964, filed on Aug. 24, 2023. The entirety of the above-mentioned patent application is hereby incorporated by reference herein and made a part of this specification.

BACKGROUND

Technical Field

The invention relates to a base and an image capturing module, and particularly relates to a rotating base and an image capturing module having the same.

Description of Related Art

An outdoor monitor typically needs to be able to adjust the angle to expand the image capturing range. Meanwhile, the outdoor monitor is also required to have good capability for waterproofing, so as to prevent moisture from intruding into the monitor and damaging the electronic components. Therefore, balancing between mobility and waterproofing performance has become an important design issue at present. Many outdoor monitors on the market apply glue to the gaps of their joints to realize waterproofing. However, such approach not only easily results in poor mobility of the monitor but is also not conducive for rework on the monitor.

SUMMARY

The invention provides a rotating base and an image capturing module, which have good waterproofness and mobility and may be easily reworked.

The rotating base of the invention includes a first housing, a second housing, a rotating assembly, an elastic tube, and at least one annular elastic member. The rotating assembly is connected between the first housing and the second housing. The elastic tube passes through the rotating assembly and extends from the first housing to the second housing. The annular elastic member is sleeved on the elastic tube and is compressed between the elastic tube and one of the first housing and the second housing.

In an embodiment of the invention, the annular elastic member is compressed between the elastic tube and the one of the first housing and the second housing along a radial direction of the elastic tube.

In an embodiment of the invention, the one of the first housing and the second housing has an annular structure. The annular structure surrounds the elastic tube. The annular elastic member is compressed between the annular structure and the elastic tube.

In an embodiment of the invention, the elastic tube has an annular step portion formed on an outer peripheral surface of the elastic tube. The annular elastic member is located between the annular step portion and the rotating assembly and stops the annular step portion along an axial direction of the elastic tube.

In an embodiment of the invention, the elastic member includes two semi-annular elastic bodies. The two semi-annular elastic bodies abut each other to form an annular shape.

In an embodiment of the invention, the annular elastic member has a fracture. The fracture extends along a radial direction of the annular elastic member.

In an embodiment of the invention, the one of the first housing and the second housing has an annular rib. The at least one annular elastic member has an annular groove. The annular rib is fastened in the annular groove.

In an embodiment of the invention, the annular elastic member is sleeved on one end of the elastic tube. Another end of the elastic tube has an annular extending portion. The annular extending portion extends from the outer peripheral surface of the elastic tube along the radial direction of the elastic tube and is compressed between the rotating assembly and another one of the first housing and the second housing.

In an embodiment of the invention, the annular extending portion is compressed between the rotating assembly and the another one of the first housing and the second housing along the axial direction of the elastic tube.

In an embodiment of the invention, the rotating assembly has an annular structure. The annular structure surrounds the elastic tube. The annular extending portion is compressed between the annular structure and the another one of the first housing and the second housing.

In an embodiment of the invention, the annular extending portion has an annular protruding portion and two opposite surfaces. The rotating assembly abuts one of the two opposite surfaces. The annular protruding portion is formed on another one of the two opposite surfaces and abuts the another one of the first housing and the second housing.

In an embodiment of the invention, the annular extending portion has a bending section connected to the outer peripheral surface of the elastic tube.

In an embodiment of the invention, the number of the annular elastic member is two. One of the annular elastic members is compressed between the first housing and the elastic tube. Another one of the annular elastic members is compressed between the second housing and the elastic tube.

In an embodiment of the invention, a material of the at least one annular elastic member is different from a material of the elastic tube.

In an embodiment of the invention, an elasticity coefficient of the at least one annular elastic member is greater than an elasticity coefficient of the elastic tube.

In an embodiment of the invention, the rotating base further includes an electric wire. The electric wire extends from an inside of the first housing to an inside of the second housing through an inside of the elastic tube.

In an embodiment of the invention, the rotating base further includes two circuit boards. The two circuit boards are respectively disposed on the inside of the first housing and the inside of the second housing. The two circuit boards are electrically connected through the electric wire.

In an embodiment of the invention, the rotating assembly includes a fixing member and a rotating member. The fixing member is fixed to the first housing, the rotating member is movably connected to the fixing member, and the second housing is fixed to the rotating member.

In an embodiment of the invention, the fixing member has a ball socket. The rotating member has a ball head. The ball head is mounted in the ball socket.

In an embodiment of the invention, the fixing member limits the at least one annular elastic member to the first housing along the axial direction of the elastic tube.

The image capturing module of the invention includes the rotating base and an image capturing unit. The image capturing unit is disposed in the second housing.

In summary, the rotating assembly of the rotating base of the invention is connected between the first housing and the second housing, and the elastic tube passes through the rotating assembly. The annular elastic member sleeved on the elastic tube and compressed between the elastic tube and the first housing or the second housing may effectively prevent external moisture from entering the gap between the elastic tube and the first housing or the second housing, thereby achieving good waterproofness. In addition, since the rotating base does not require gluing to the gaps of the joint in the manufacturing process, the rotating base has good mobility and is able to be easily reworked.

DESCRIPTION OF THE EMBODIMENTS

Figure 1:
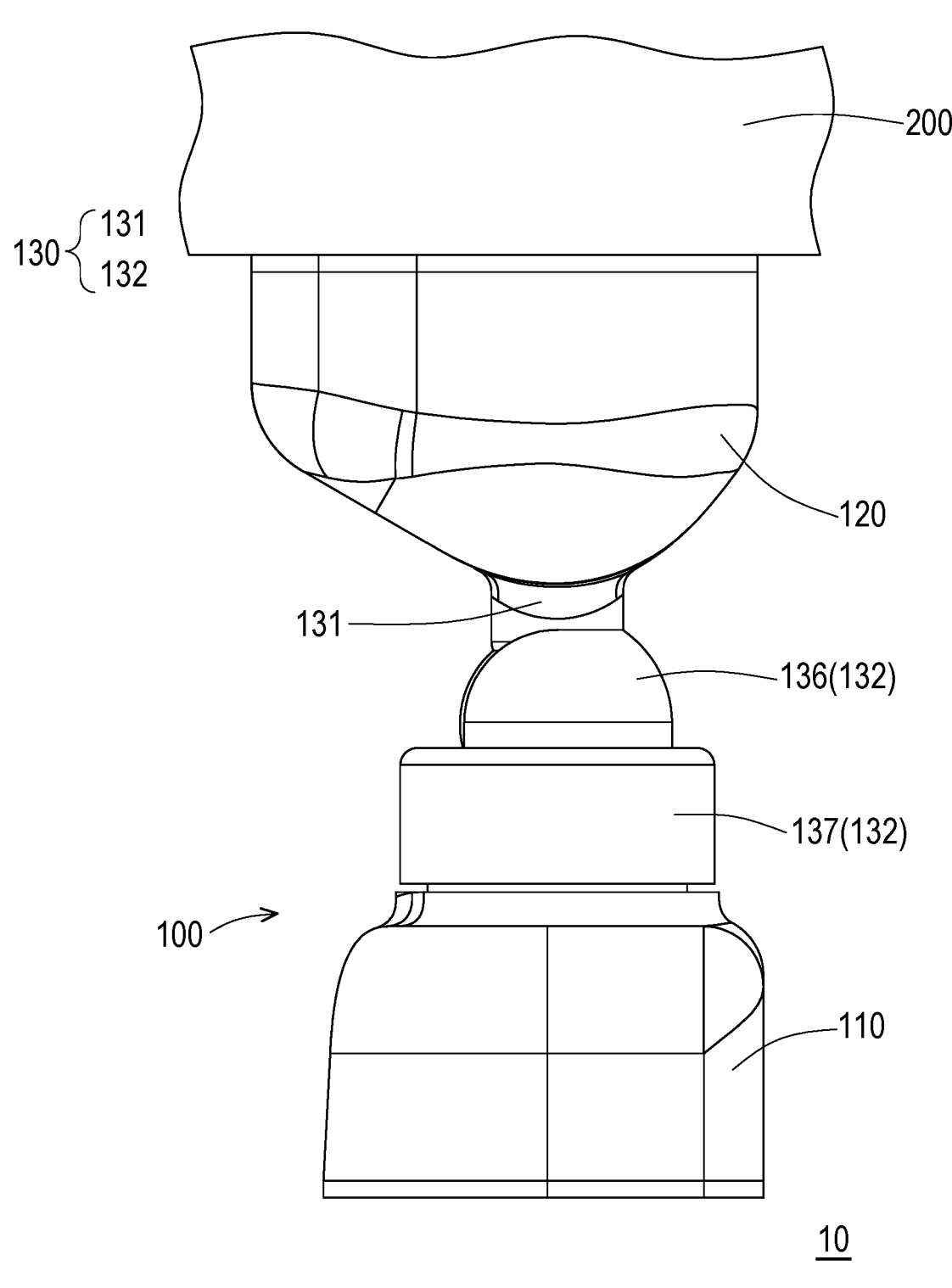
FIG. 1 is a schematic side view of an image capturing module according to an embodiment of the invention.

It should be noted that in the description of each of the following embodiments, the so-called "first" and "second" are used to describe different elements, and these elements are not limited by such predicates. In addition, for the convenience and clarity of explanation, the thickness or size of each component in the drawings is exaggerated, omitted or schematically expressed to facilitate the understanding and reading of those familiar with this art, and the size of each component is not entirely the actual size and is not used to limit the implementation of the invention. Therefore, it has no technical substantive significance. Any structural modifications, changes in proportions or adjustments in size that do not affect the efficacy of the invention and the purposes it serves should still fall within the scope of the technical content disclosed in the invention. The same reference numbers will be used throughout the drawings to refer to the same or similar elements.

FIG. 1 is a schematic side view of an image capturing module according to an embodiment of the invention. FIG.

Figure 2:
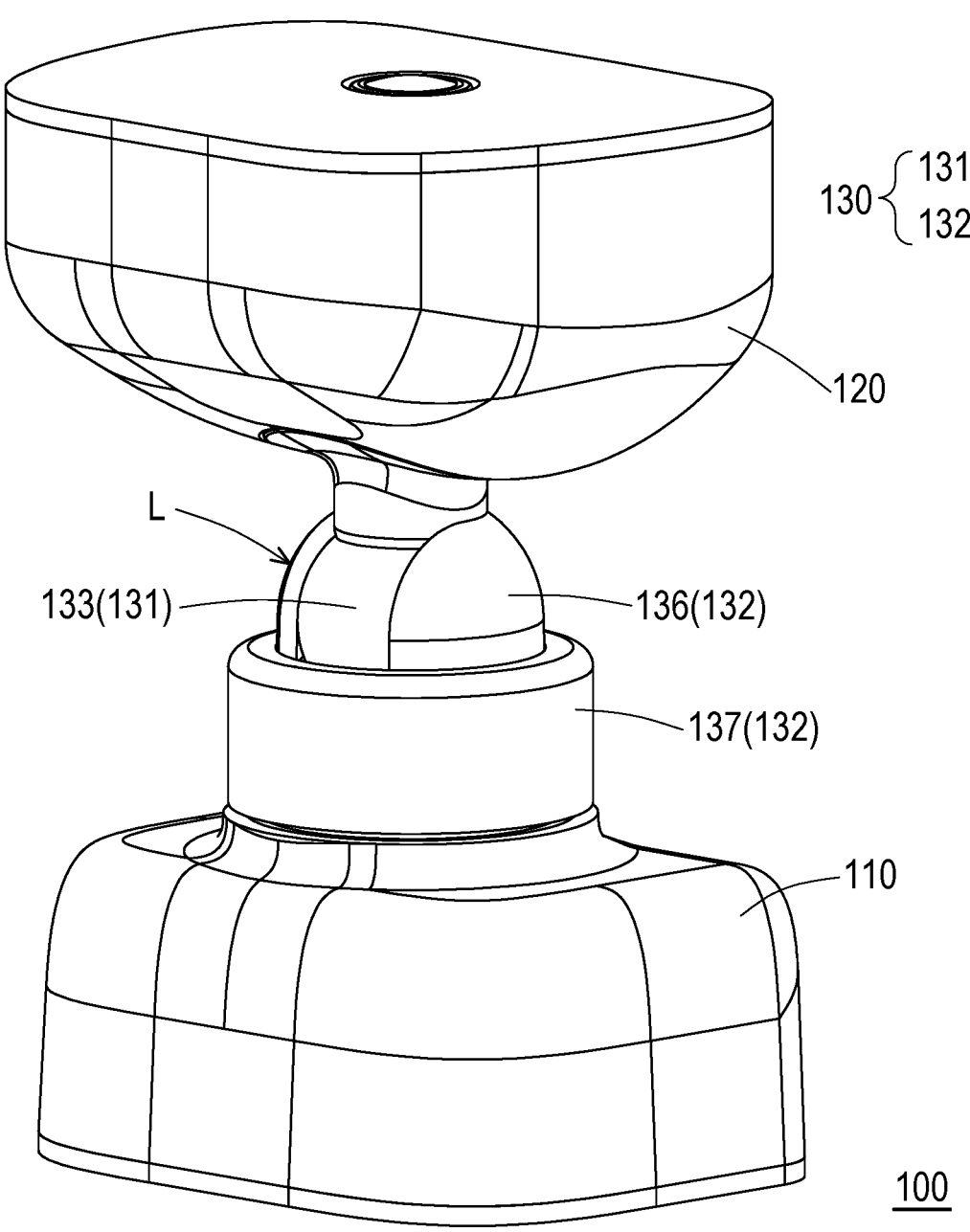
FIG. 2 is a perspective view of the rotating base of FIG. 1.
Figure 3:
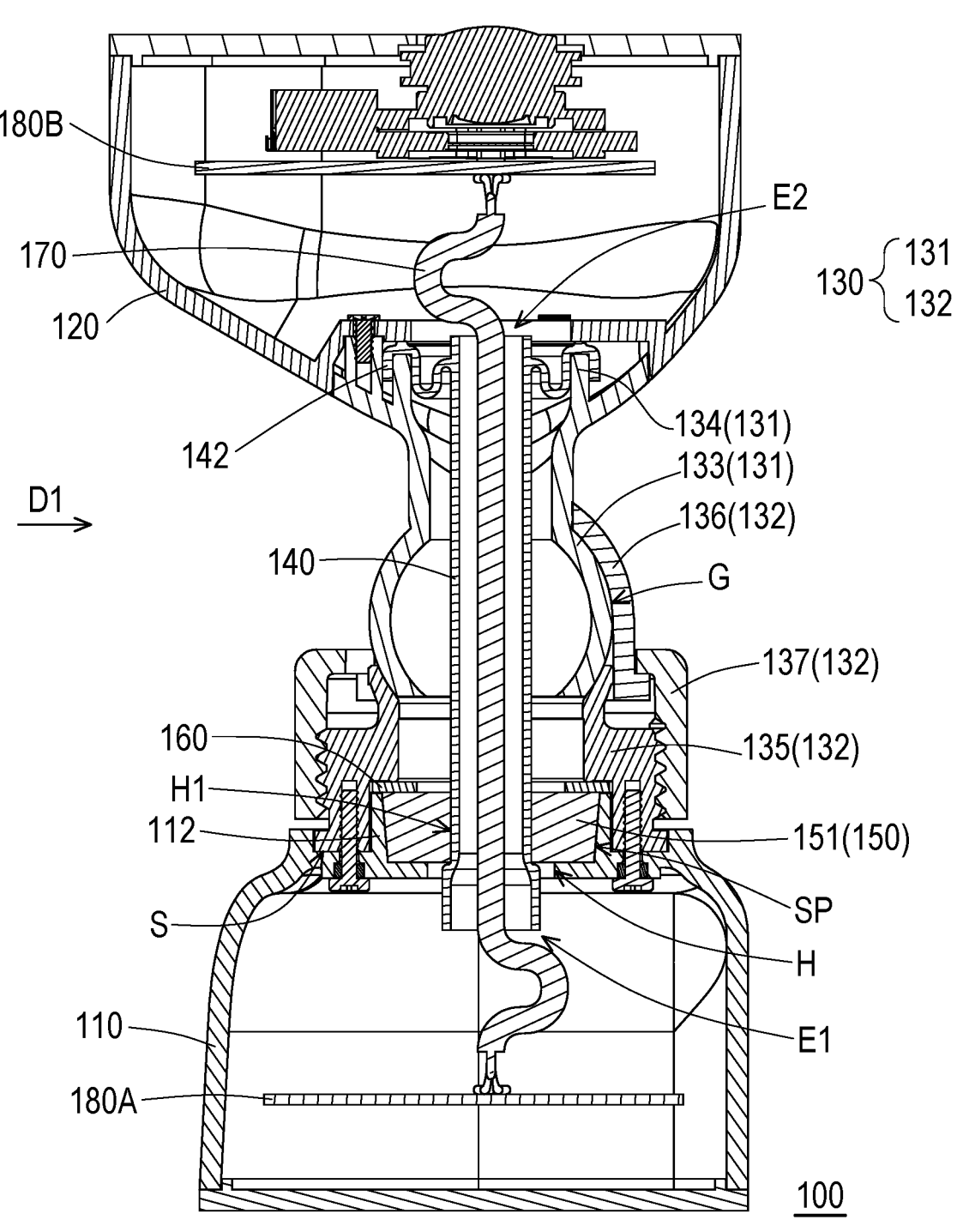
FIG. 3 is a cross-sectional view of the rotating base in FIG. 1.

2 is a perspective view of the rotating base of FIG. 1. FIG. 3 is a cross-sectional view of the rotating base in FIG. 1. Referring to FIG. 1 to FIG. 3, an image capturing module 10 in the present embodiment includes a rotating base 100 and an image capturing unit 200. The image capturing module 10 is, for example, an outdoor monitor, which may capture images of the external environment through the image capturing unit 200, and adjust the position and angle of the image capturing unit 200 through the rotating base 100, but the application of the image capturing module 10 is not limited thereto.

The rotating base 100 in the present embodiment includes a first housing 110, a second housing 120, a rotating assembly 130, an elastic tube 140 (FIG. 3), and at least one annular elastic member 150 (FIG. 3). For example, the first housing 110 may be disposed on the ceiling or the wall, but the invention is not limited thereto. The image capturing unit 200 is disposed in the second housing 120, and the rotating assembly 130 is connected between the first housing 110 and the second housing 120. The elastic tube 140 passes through the rotating assembly 130 and extends from the first housing 110 to the second housing 120. The annular elastic member 150 is sleeved on the elastic tube 140 and compressed between the first housing 110 and the elastic tube 140. Thereby, the intrusion of external moisture into the rotating base 100 may be effectively prevented, an excellent effect of waterproofing may be achieved, and the mobility of the rotating base 100 may also be realized. This design will be described in detail below.

Figure 4:
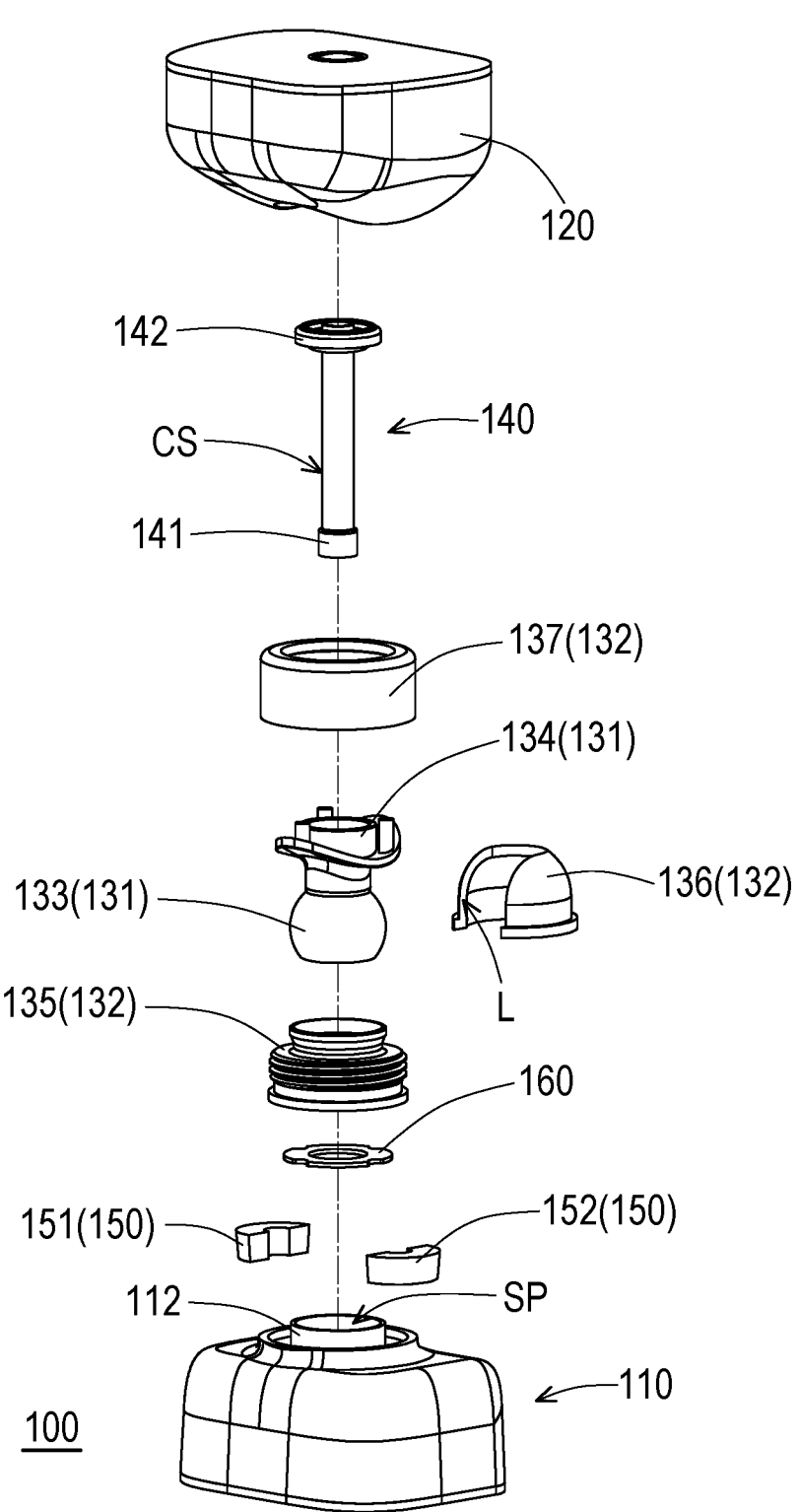
FIG. 4 is an exploded view of the rotating base of FIG. 2.

FIG. 4 is an exploded view of the rotating base of FIG. 2. Referring to FIG. 3 and FIG. 4, the first housing 110 has an annular structure 112 and an opening H. The annular structure 112 protrudes from an upper surface S of the first housing 110 and surrounds an accommodating space SP, and the accommodating space SP may accommodate the annular elastic member 150. The opening H corresponds to the accommodating space SP and is able to allow the elastic tube 140 to pass through.

The annular elastic member 150 includes two semi-annular elastic bodies 151, 152 (FIG. 4), and the two semi-annular elastic bodies 151, 152 abut each other to form an annular shape. The annular structure 112 surrounds the elastic tube 140. The elastic tube 140 passes through the opening H and a central hole H1 of the annular elastic member 150. The annular elastic member 150 is compressed between the annular structure 112 of the first housing 110 and the elastic tube 140 along a radial direction D1 of the elastic tube 140.

Further, the material of the elastic tube 140 and the material of the annular elastic member 150 may be, for example, rubber, which is elastic and deformable. The material of the annular elastic member 150 in the present embodiment is different from the material of the elastic tube 140. For example, the elasticity coefficient of the annular elastic member 150 is greater than the elasticity coefficient of the elastic tube 140. Since the elasticity coefficient of the elastic tube 140 is lower, the elastic tube 140 is easily deformed and may be bent with the rotation of the rotating assembly 130 without affecting the mobility of the rotating base 100. On the other hand, due to the higher elasticity coefficient of the annular elastic member 150, the annular elastic member 150 is less easily deformed and may be compacted between the elastic tube 140 and the annular structure 112 of the first housing 110, preventing external moisture from entering the first housing 110 through the accommodating space SP, thereby achieving good waterproofness.

The structure of the rotating assembly 130 in the embodiment will be illustrated in detail below. The rotating assembly 130 in the present embodiment includes a rotating member 131 and a fixing member 132. The fixing member 132 is fixed to the first housing 110, the rotating member 131 is movably connected to the fixing member 132, and the second housing 120 is fixed to the rotating member 131. Specifically, the fixing member 132 includes a carrying member 135, a limiting member 136, and a cover 137. The carrying member 135 is locked to the upper surface S of the first housing 110. The cover 137 is screwed on the carrying member 135 to press the limiting member 136 against the carrying member 135.

The limiting member 136 has a ball socket G and a limiting opening L (FIG. 4), and the rotating member 131 has a ball head 133. The ball head 133 is mounted in the ball socket G, and a part of the rotating member 131 extends out of the limiting opening L and may rotate relative to the fixing member 132 along the limiting opening L, so that the second housing 120 may rotate relative to the first housing 110, thereby adjusting the position and angle of the image capturing unit 200 (FIG. 1) relative to the first housing 110.

Figure 5A:
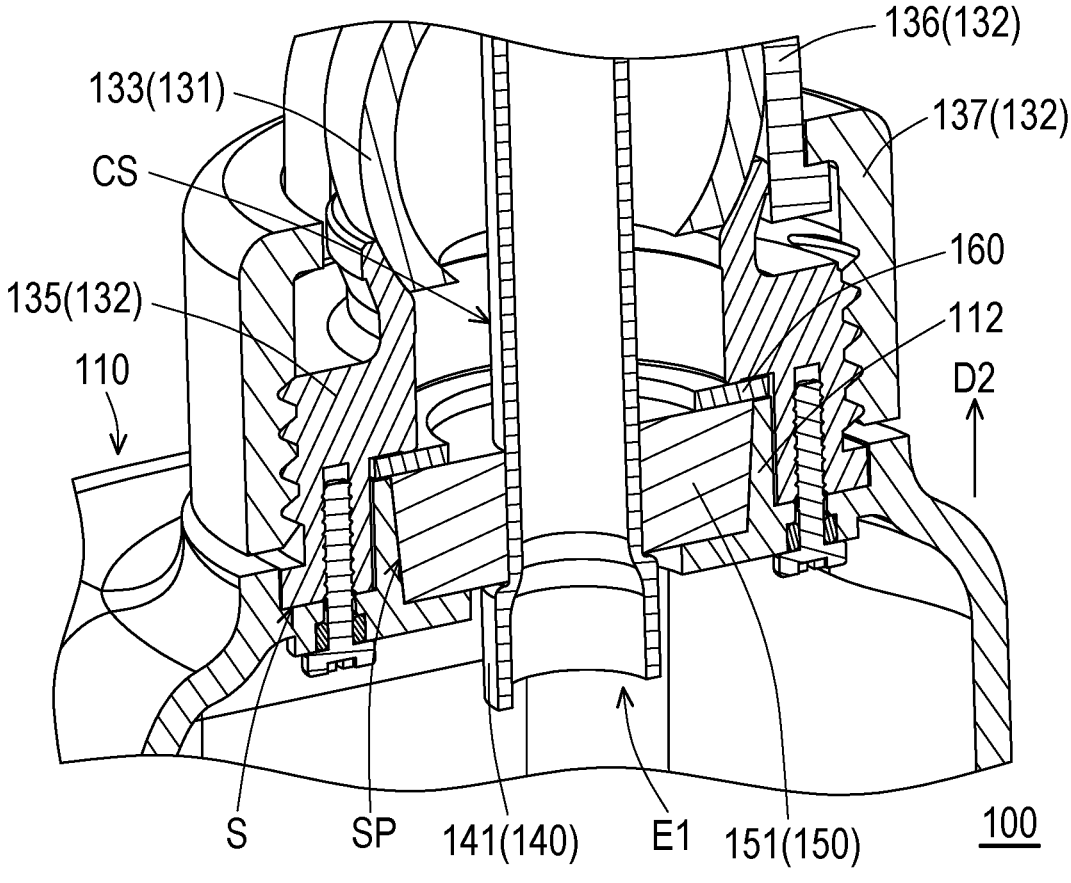
FIG. 5A is a partial perspective and cross-sectional view of the rotating base in FIG. 2.

FIG. 5A is a partial perspective and cross-sectional view of the rotating base in FIG. 2. To clearly show the elastic tube, the electric wire is hidden. Referring to FIG. 5A, the fixing member 132 may limit the annular elastic member 150 on the first housing 110 along an axial direction D2 of the elastic tube 140. Specifically, the rotating base 100 further includes an annular fixing sheet 160. The material of the annular fixing sheet 160 is, for example, metal, but the material of the annular fixing sheet 160 is not limited thereto.

The annular fixing sheet 160 is adjacent between the carrying member 135 and the annular elastic member 150. When the carrying member 135 is locked to the upper surface S of the first housing 110, the carrying member 135 presses against the annular fixing sheet 160 and limits the annular elastic member 150 within the accommodating space SP of the first housing 110 along the axial direction D2 of the elastic tube 140. In another embodiment, annular fixing sheet 160 may be integrally formed with the carrying member 135.

In addition, the annular elastic member 150 is sleeved on one end E1 of the elastic tube 140, the end E1 of the elastic tube 140 has an annular step portion 141, and the annular step portion 141 is formed on an outer peripheral surface CS of the elastic tube 140. The annular elastic member 150 is located between the annular step portion 141 and the carrying member 135 of the rotating assembly 130 and stops the annular step portion 141 along the axial direction D2 of the elastic tube 140, preventing the elastic tube 140 from being pulled and detached from the annular elastic member 150 when the rotating member 131 rotates and affecting the waterproofness of the rotating base 100.

Figure 5B:
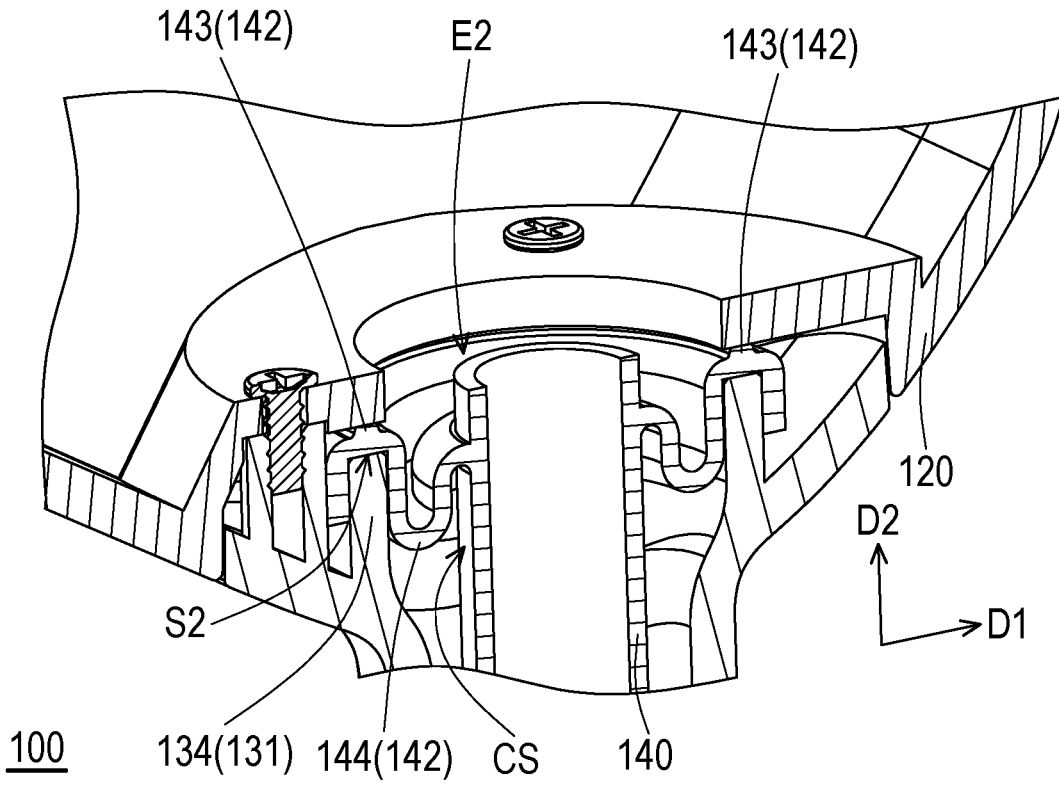
FIG. 5B is another partial perspective and cross-sectional view of the rotating base of FIG. 2.
Figure 6:
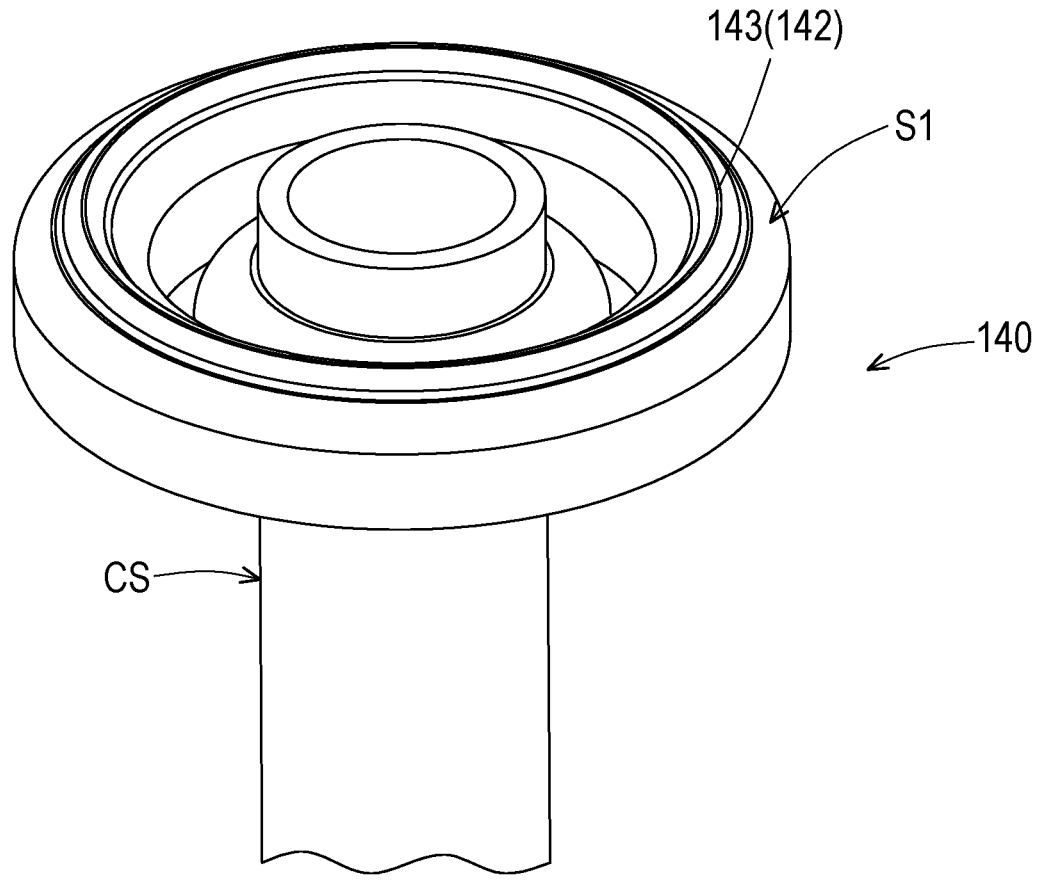
FIG. 6 is a partial enlarged view of the elastic tube of FIG. 2.

FIG. 5B is another partial perspective and cross-sectional view of the rotating base of FIG. 2. FIG. 6 is a partial enlarged view of the elastic tube of FIG. 2. Referring to FIG. 5B and FIG. 6, the other end E2 of the elastic tube 140 has an annular extending portion 142, the annular extending portion 142 extends from the outer peripheral surface CS of the elastic tube 140 along the radial direction D1 of the elastic tube 140 and is compressed between the first housing 120 and the rotating member 131 of the rotating assembly 130.

In detail, the annular extending portion 142 has an annular protruding portion 143 and two opposite surfaces S1 (FIG. 6) and S2, and the annular protruding portion 143 is formed on the surface S1 of the annular extending portion 142. The rotating member 131 of the rotating assembly 130 has an annular structure 134, and the annular structure 134 extends toward the second housing 120 and surrounds the elastic tube 140.

When the elastic tube 140 passes through the rotating member 131 and the rotating member 131 is locked to the second housing 120, the annular structure 134 of the rotating member 131 abuts against the surface S2 of the annular extending portion 142, and the annular protruding portion 143 abuts against the second housing 120, so that the annular extending portion 142 is compressed between the second housing 120 and the annular structure 134 along the axial direction D2 of the elastic tube 140, preventing external moisture from entering the second housing 120 through the gap between the rotating member 131 and the second housing 120, and thereby achieving excellent waterproofness.

In addition, the annular extending portion 142 further has a bending section 144, and the bending section 144 is bendably connected to the outer peripheral surface CS of the elastic tube 140 and is located between the outer peripheral surface CS and the annular protruding portion 143. The bending section 144 provides a margin for the expansion of the elastic tube 140 to prevent the elastic tube 140 from being over-stretched and then loosened or damaged when the rotating member 131 rotates, which may affect the waterproofness of the rotating base 100.

Return to FIG. 3. The rotating base 100 further includes an electric wire 170 and two circuit boards 180A and 180B. The circuit boards 180A and 180B are respectively disposed on an inside of the first housing 110 and an inside of the second housing 120. The electric wire 170 extends from the inside of the first housing 110 to the inside of the second housing 120 through an inside of the elastic tube 140, and the circuit boards 180A and 180B are electrically connected to each other through the electric wire 170. Through the design that the annular elastic member 150 is compacted between the first housing 110 and the elastic tube 140, and the annular extending portion 142 of the elastic tube 140 is compacted between the second housing 120 and the rotating member 131, the inside of the first housing 110, the inside of the elastic tube 140 and the inside of the second housing 120 together may form an enclosed space, preventing external moisture from entering the rotating base 100 (for example, external moisture may enter the inside of the first housing 110 of the rotating base 100 through the fixing member 132 of the rotating assembly 130 and the accommodating space SP, or may enter the inside of the second housing 120 through the gap between the rotating member 131 and the second housing 120) and damaging the electric wire 170 and the circuit board 180A, 180B, thereby achieving good waterproofness.

In the present embodiment, the annular elastic member 150 and the annular structure 112 are located in the first housing 110, and the annular extending portion 142 of the elastic tube 140 is located in the second housing 120. Of course, in other embodiments, the annular elastic member 150 and the annular structure 112 may be arranged in the second housing 120, and the annular extending portion 142 of the elastic tube 140 may be located in the first housing 110, that is, an upside-down configuration of the present embodiment, and the invention is not limited thereto.

In addition, if both of the ends E1 and E2 of the elastic tube 140 have an integral annular design (i.e., the annular extending portion 142), it will be impossible to demold during the manufacturing process and will be difficult to assemble. Therefore, the end E1 of the elastic tube 140 is provided with a structure where the elastic tube 140 of the rotating base 100 and the annular elastic member 150 are separated, which is not only convenient for demolding but easy to be assembled to the first housing 110. In addition, this design does not require gluing to the gaps of the joint to realize waterproofing, so it does not affect the mobility of the rotating base 100 and is conducive for rework.

Figure 7A:
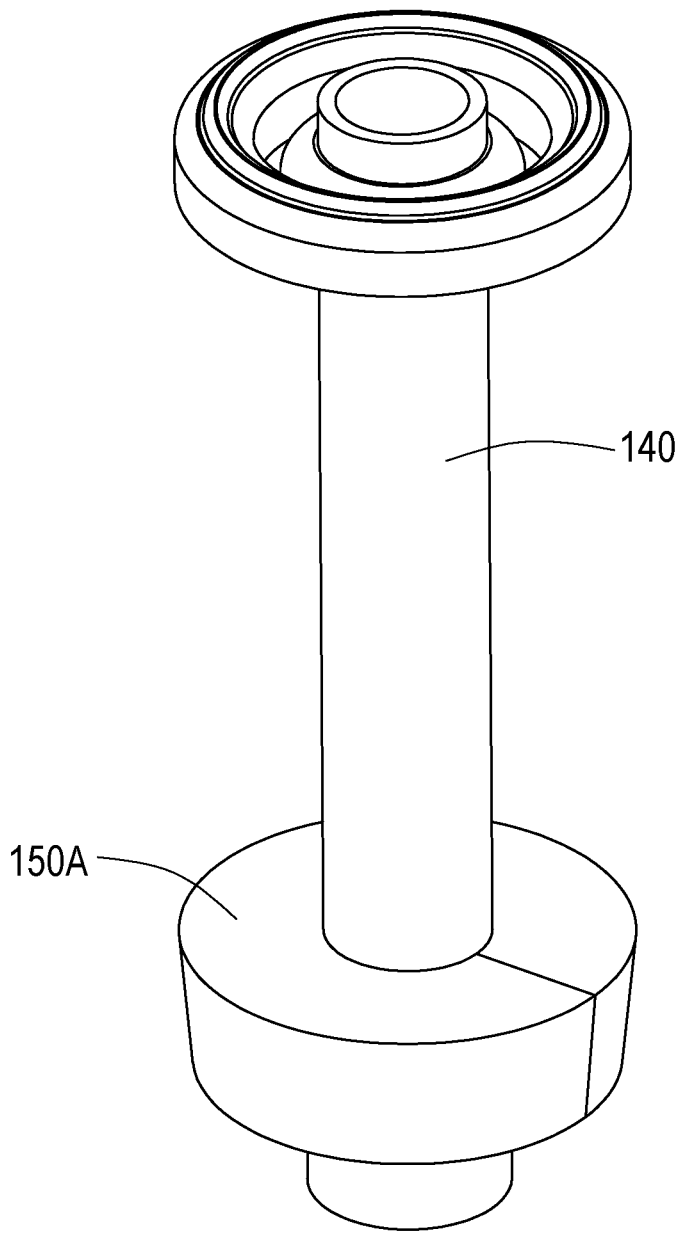
FIG. 7A is a perspective view of an annular elastic member and an elastic tube according to another embodiment of the invention.
Figure 7B:
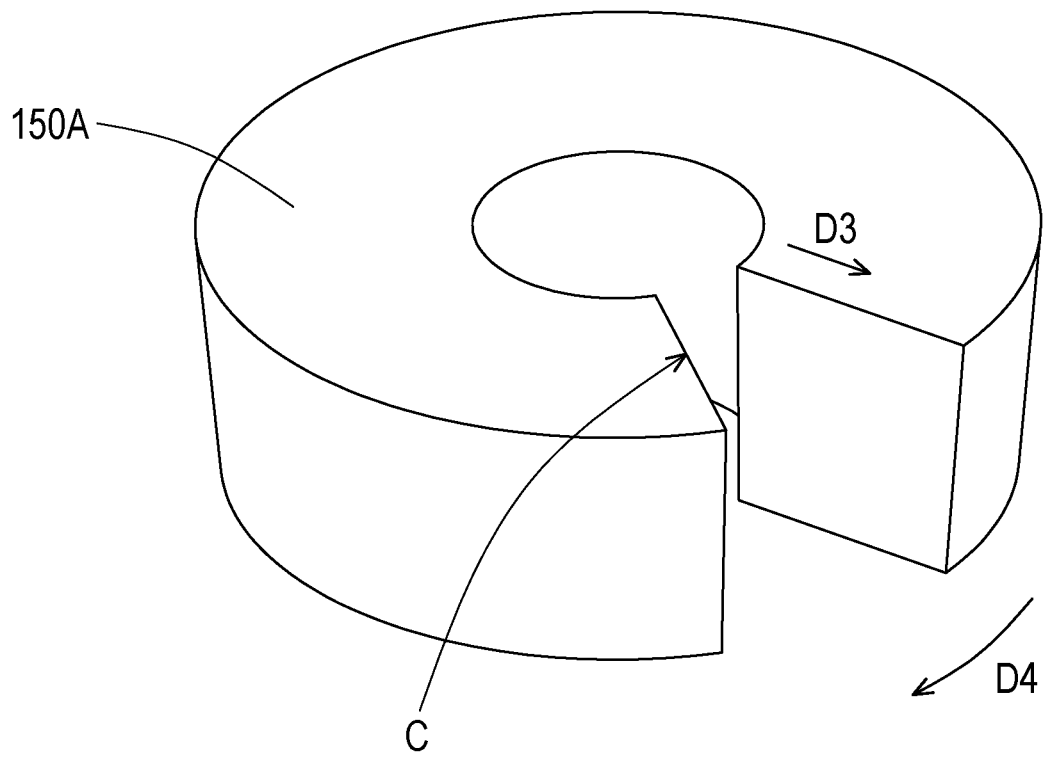
FIG. 7B is a schematic diagram of the annular elastic member, compressed along the circumferential direction, of FIG. 7A.

FIG. 7A is a perspective view of an annular elastic member and an elastic tube according to another embodiment of the invention. FIG. 7B is a schematic diagram of the annular elastic member, compressed along the circumferential direction, of FIG. 7A. A main difference between the embodiment shown in FIG. 7A and the embodiment shown in FIG. 4 is that the annular elastic member 150A in FIG. 7A is an annular elastic body with a fracture C. The fracture C extends along a radial direction D3 of the annular elastic member 150A (FIG. 7B). The annular elastic member 150A may be stretched along a circumferential direction D4 (FIG. 7B) of the annular elastic member 150A, making it convenient to pass the elastic tube 140 through the annular elastic member 150A.

Figure 8A:
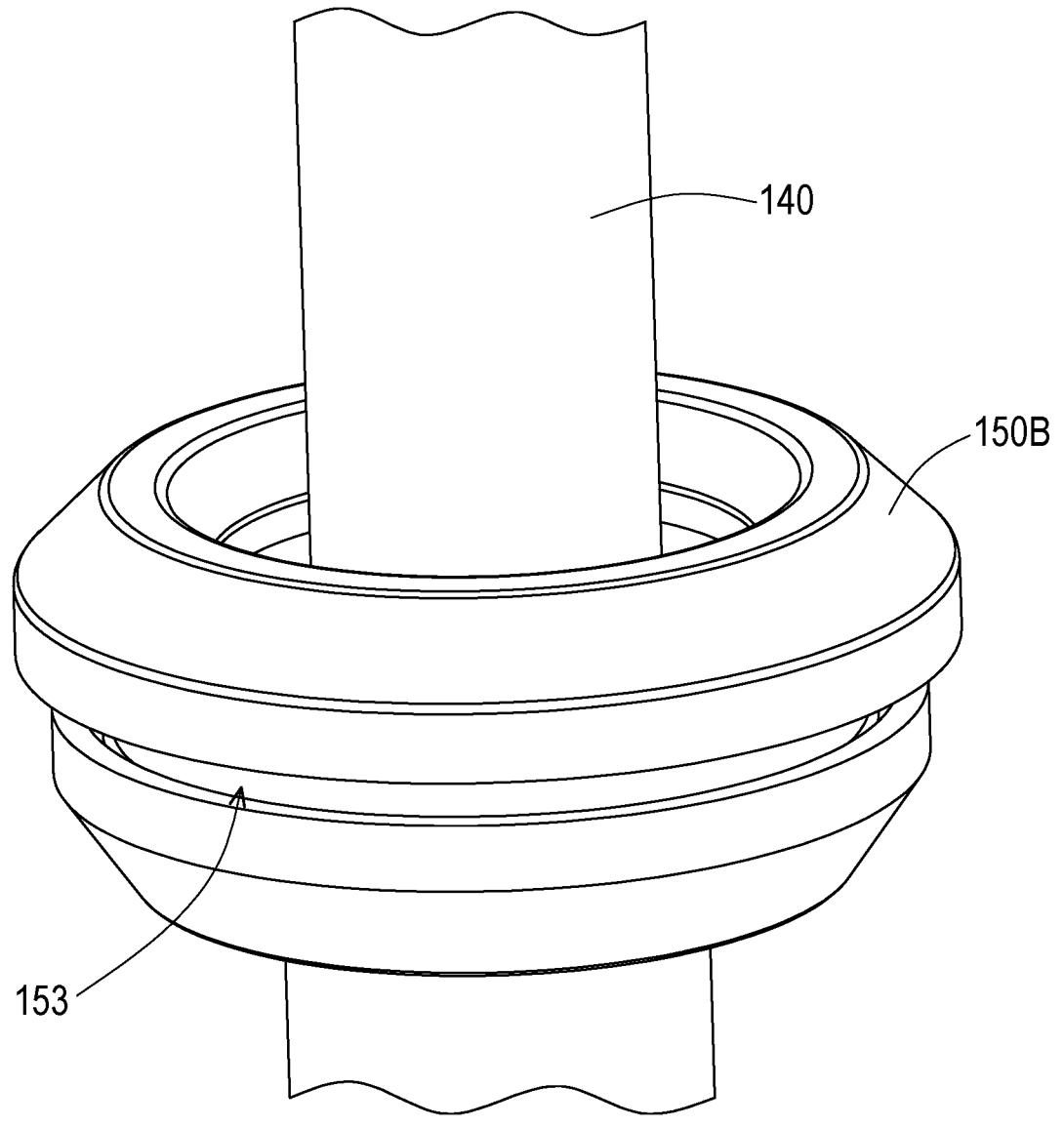
FIG. 8A is a partial perspective view of an annular elastic member and an elastic tube according to another embodiment of the invention.
Figure 8B:
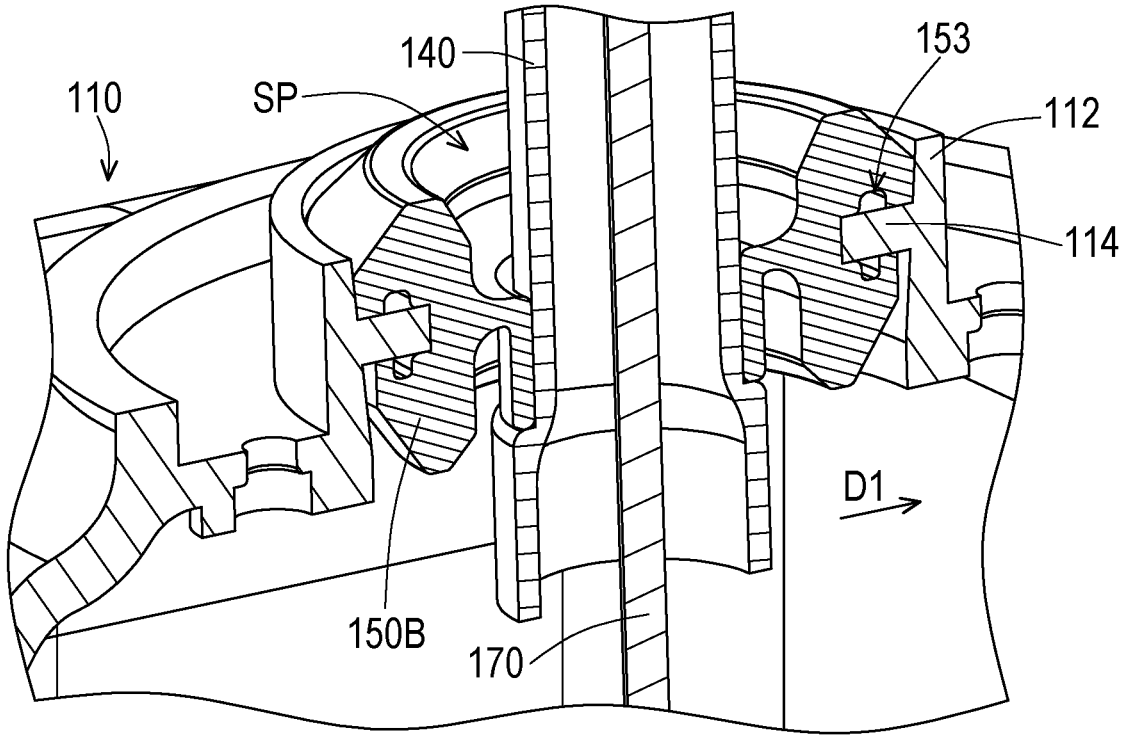
FIG. 8B is a partial perspective cross-sectional view of the annular elastic member, disposed on the rotating base, of FIG. 8A.

FIG. 8A is a partial perspective view of an annular elastic member and an elastic tube according to another embodiment of the invention. FIG. 8B is a partial perspective cross-sectional view of the annular elastic member, disposed on the rotating base, of FIG. 8A. A main difference between the embodiment shown in FIG. 8A and the embodiment shown in FIG. 4 is that the annular elastic member 150B in FIG. 8A is a continuous annular structure with an annular groove 153. Specifically, as shown in FIG. 8B, one of the first housing 110 and the second housing 120 (shown as the first housing 110) has an annular rib 114. The elastic tube 140 is sleeved on the annular elastic member 150B and the annular elastic member 150B is located in the accommodating space SP. The annular groove 153 of the annular elastic member 150B is fastened to the annular rib 114. The annular elastic member 150B is compressed between the annular structure 112 of the first housing 110 and the elastic tube 140 along the radial direction D1 of the elastic tube 140.

Figure 9:
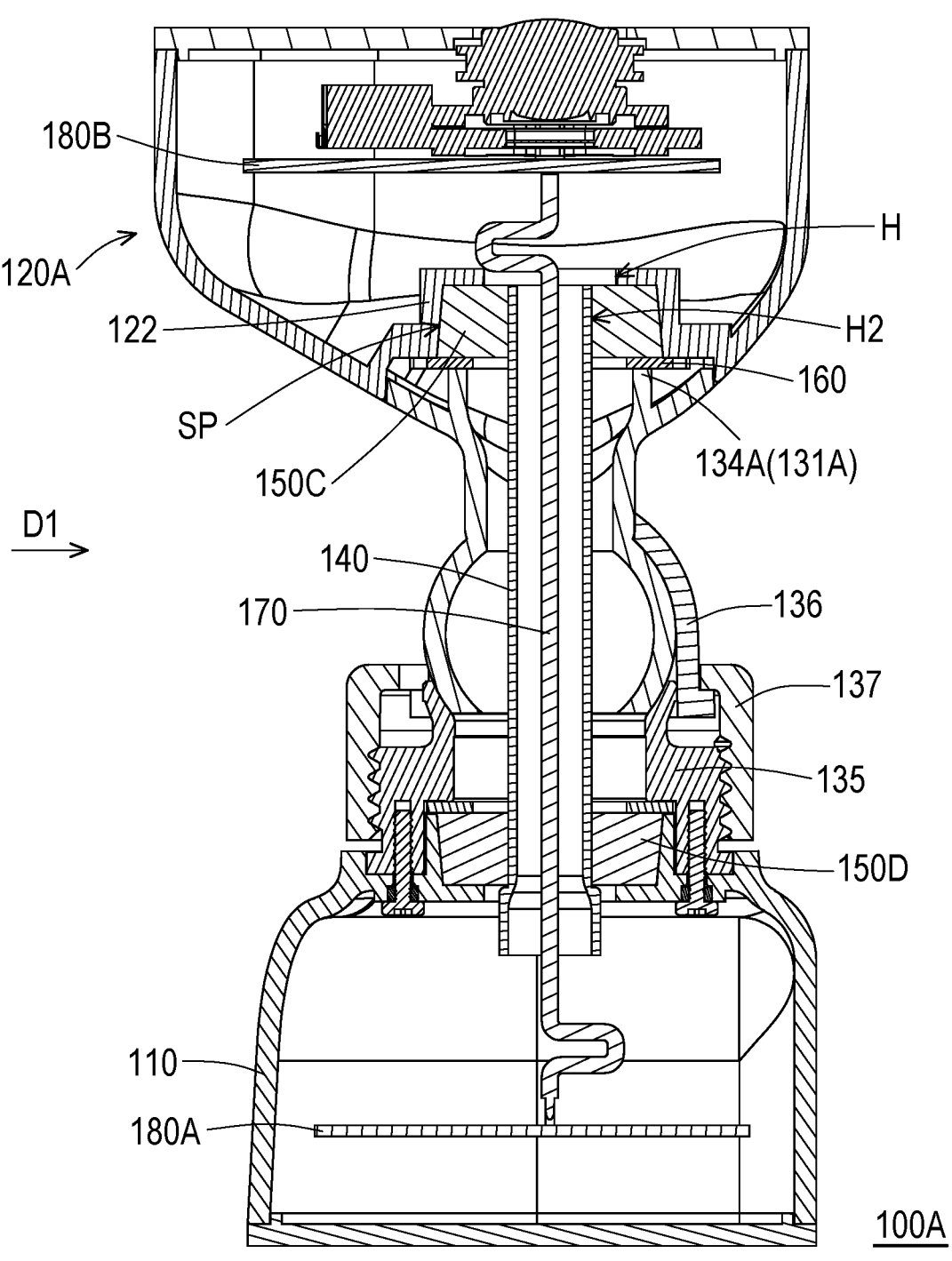
FIG. 9 is a cross-sectional view of a rotating base according to another embodiment of the invention.

FIG. 9 is a cross-sectional view of a rotating base according to another embodiment of the invention. A main difference between the embodiment shown in FIG. 9 and the embodiment shown in FIG. 2 is that the rotating base 100A in FIG. 9 has two annular elastic members 150C and 150D, and the annular elastic member 150C is compressed between the second housing 120A and the elastic tube 140, and the annular elastic member 150D is compressed between the first housing 110 and the elastic tube 140. That is to say, in the present embodiment, not only the first housing 110 is provided with annular elastic member 150D, but the second housing 120A is also provided with annular elastic member 150C, instead of the design in the embodiment shown in FIG. 3 where the second housing 120 realizes waterproofness using the annular extending portion 142.

Specifically, the second housing 120A has an annular structure 122 and an opening H. The annular structure 122 surrounds the accommodating space SP to accommodate the annular elastic member 150C, and the opening H corresponds to the accommodating space SP. When the rotating member 131A is fixed on the second housing 120A, the annular structure 134A of the rotating member 131A abuts against the annular fixing sheet 160, and the annular fixing sheet 160 abuts against the annular elastic member 150C in the accommodating space SP, so that the annular elastic member 150C is limited within the accommodating space SP of the second housing 120A. The electric wire 170 may be connected to the circuit board 180B through the inside of the elastic tube 140 and the opening H of the second housing 120A. The elastic tube 140 extends to the second housing 120A, the annular structure 122 surrounds the elastic tube 140, and the elastic tube 140 passes through a central hole H2 of the annular elastic member 150C, so that the annular elastic member 150C is compressed between the annular structure 122 of the second housing 120A and the elastic tube 140 along the radial direction D1 of the elastic tube 140. The manner in which the annular elastic member 150D is configured in the first housing 110 is the same or similar to the aforementioned manner in which the annular elastic member 150 is configured, and will not be described again here.

In summary, the rotating assembly of the rotating base of the invention is connected between the first housing and the second housing, and the elastic tube passes through the rotating assembly. Through the design where the annular elastic member is sleeved on the elastic tube and is compressed between the elastic tube and the first housing or the second housing, or the elastic tube is compressed between the second housing and the rotating member, effectively preventing external moisture from entering the rotating base through the gap between the elastic tube and the first housing or the second housing, thereby avoiding damage to the circuit boards and electric wire inside the rotating base and achieving good waterproofness. In addition, since there is no need to apply glue to the gaps of the joint during the manufacturing process of the rotating base, the rotating base has good mobility and is able to be easily reworked.

What is claimed is:

1. A rotating base, comprising:
   a first housing;
   a second housing;
   a rotating assembly, connected between the first housing and the second housing;
   an elastic tube, passing through the rotating assembly and extending from the first housing to the second housing; and
   at least one annular elastic member, sleeved on the elastic tube and compressed between the elastic tube and one of the first housing and the second housing,
   wherein the elastic tube has an annular step portion formed on an outer peripheral surface of the elastic tube, and the at least one annular elastic member is located between the annular step portion and the rotating assembly and stops the annular step portion along an axial direction of the elastic tube.

2. The rotating base according to claim 1, wherein the at least one annular elastic member is compressed between the elastic tube and the one of the first housing and the second housing along a radial direction of the elastic tube.

3. The rotating base according to claim 1, wherein the one of the first housing and the second housing has an annular structure, the annular structure surrounds the elastic tube, and the at least one annular elastic member is compressed between the annular structure and the elastic tube.

4. The rotating base according to claim 1, wherein the at least one annular elastic member includes two semi-annular elastic bodies, and the two semi-annular elastic bodies abut each other to form an annular shape.

5. The rotating base according to claim 1, wherein the at least one annular elastic member has a fracture, and the fracture extends along a radial direction of the at least one annular elastic member.

6. The rotating base according to claim 1, wherein the one of the first housing and the second housing has an annular rib, the at least one annular elastic member has an annular groove, and the annular rib is fastened in the annular groove.

7. The rotating base according to claim 1, wherein the at least one annular elastic member is sleeved on one end of the elastic tube, another end of the elastic tube has an annular extending portion, and the annular extending portion extends from the outer peripheral surface of the elastic tube along a radial direction of the elastic tube and is compressed between the rotating assembly and another one of the first housing and the second housing.

8. The rotating base according to claim 7, wherein the annular extending portion is compressed between the rotating assembly and the another one of the first housing and the second housing along the axial direction of the elastic tube.

9. The rotating base according to claim 7, wherein the rotating assembly has an annular structure surrounding the elastic tube, and the annular extending portion is compressed between the annular structure and the another one of the first housing and the second housing.

10. The rotating base according to claim 7, the annular extending portion has an annular protruding portion and two opposite surfaces, the rotating assembly abuts one of the two opposite surfaces, the annular protruding portion is formed on another one of the two opposite surfaces and abuts the another one of the first housing and the second housing.

11. The rotating base according to claim 7, wherein the annular extending portion has a bending section connected to the outer peripheral surface of the elastic tube.

12. The rotating base according to claim 1, wherein the number of the at least one annular elastic member is two, one of the annular elastic members is compressed between the first housing and the elastic tube, and another one of the annular elastic members is compressed between the second housing and the elastic tube.

13. The rotating base according to claim 1, wherein a material of the at least one annular elastic member is different from a material of the elastic tube.

14. The rotating base according to claim 1, wherein an elasticity coefficient of the at least one annular elastic member is greater than an elasticity coefficient of the elastic tube.

15. The rotating base according to claim 1, further comprising an electric wire, wherein the electric wire extends from an inside of the first housing to an inside of the second housing through an inside of the elastic tube.

16. The rotating base according to claim 15, further comprising two circuit boards, wherein the two circuit boards are respectively disposed on the inside of the first housing and the inside of the second housing, and the two circuit boards are electrically connected through the electric wire.

17. The rotating base according to claim 1, wherein the rotating assembly includes a fixing member and a rotating member, the fixing member is fixed to the first housing, the rotating member is movably connected to the fixing member, and the second housing is fixed to the rotating member.

18. The rotating base according to claim 17, wherein the fixing member has a ball socket, the rotating member has a ball head, and the ball head is mounted in the ball socket.

19. The rotating base according to claim 17, wherein the fixing member limits the at least one annular elastic member to the first housing along the axial direction of the elastic tube.

20. An image capturing module, comprising:
the rotating base according to claim 1; and
an image capturing unit, disposed in the second housing.

21. A rotating base, comprising:
a first housing;
a second housing;
a rotating assembly, connected between the first housing and the second housing;
an elastic tube, passing through the rotating assembly and extending from the first housing to the second housing; and
at least one annular elastic member, sleeved on the elastic tube and compressed between the elastic tube and one of the first housing and the second housing,
wherein the one of the first housing and the second housing has an annular rib, the at least one annular elastic member has an annular groove, and the annular rib is fastened in the annular groove.

22. A rotating base, comprising:
a first housing;
a second housing;
a rotating assembly, connected between the first housing and the second housing;
an elastic tube, passing through the rotating assembly and extending from the first housing to the second housing; and
at least one annular elastic member, sleeved on the elastic tube and compressed between the elastic tube and one of the first housing and the second housing,
wherein the at least one annular elastic member is sleeved on one end of the elastic tube, another end of the elastic tube has an annular extending portion, and the annular extending portion extends from an outer peripheral surface of the elastic tube along a radial direction of the elastic tube and is compressed between the rotating assembly and another one of the first housing and the second housing.

* * * * *